(12) United States Patent
Meng et al.

(10) Patent No.: US 11,539,716 B2
(45) Date of Patent: Dec. 27, 2022

(54) ONLINE USER BEHAVIOR ANALYSIS SERVICE BACKED BY DEEP LEARNING MODELS TRAINED ON SHARED DIGITAL INFORMATION

(71) Applicant: DataVisor, Inc., Mountain View, CA (US)

(72) Inventors: Cong A. Meng, Fremont, CA (US); Yuetong Wang, Stanford, CA (US); Yang Xu, Sunnyvale, CA (US); Buodo Li, Palo Alto, CA (US); Ting-Fang Yen, Sunnyvale, CA (US); Fang Yu, Sunnyvale, CA (US); Yinglian Xie, Cupertino, CA (US)

(73) Assignee: DataVisor, Inc., Mountain View, CA (US)

( * ) Notice: Subject to any disclaimer, the term of this patent is extended or adjusted under 35 U.S.C. 154(b) by 575 days.

(21) Appl. No.: 16/526,402

(22) Filed: Jul. 30, 2019

(65) Prior Publication Data
US 2020/0045066 A1  Feb. 6, 2020

Related U.S. Application Data

(60) Provisional application No. 62/712,648, filed on Jul. 31, 2018.

(51) Int. Cl.
*H04L 9/40* (2022.01)
*G06N 3/08* (2006.01)

(52) U.S. Cl.
CPC .......... *H04L 63/1416* (2013.01); *G06N 3/08* (2013.01)

(58) Field of Classification Search
CPC ....... H04L 63/1416; G06N 3/08; G06N 3/088
USPC ........................................................ 726/23
See application file for complete search history.

(56) References Cited

U.S. PATENT DOCUMENTS

| | | | |
|---|---|---|---|
| 8,881,281 B1* | 11/2014 | Mitchell | H04L 63/30 709/224 |
| 9,787,640 B1 | 10/2017 | Xie et al. | |
| 10,009,358 B1 | 6/2018 | Xie et al. | |
| 10,110,616 B1 | 10/2018 | Xie et al. | |
| 10,129,288 B1 | 11/2018 | Xie et al. | |
| 10,825,028 B1* | 11/2020 | Kramme | G06Q 20/102 |
| 10,970,647 B1* | 4/2021 | Cevahir | H04L 51/52 |
| 11,074,434 B2* | 7/2021 | Gupta | G06K 9/6215 |
| 2006/0236395 A1* | 10/2006 | Barker | G06F 21/552 726/23 |
| 2013/0080368 A1* | 3/2013 | Nandy | G06Q 30/018 706/47 |
| 2014/0331119 A1* | 11/2014 | Dixon | G06Q 30/02 715/234 |
| 2016/0182544 A1* | 6/2016 | Adjaoute | G06Q 30/0185 705/7.15 |

(Continued)

*Primary Examiner* — Badri Narayanan Champakesan
(74) *Attorney, Agent, or Firm* — Fish & Richardson P.C.

(57) ABSTRACT

Methods, systems, and apparatus, including computer programs encoded on computer storage media, for online fraud protection. One of the methods includes receiving a query associated with a user account of an online service provider; providing the query to a deep neural network model to generate a prediction of whether the user account is fraudulent, wherein the deep neural network model is trained using anonymized event data for a collection of users received from one or more online service providers; and providing the prediction to the online service provider.

20 Claims, 5 Drawing Sheets

(56) References Cited

U.S. PATENT DOCUMENTS

| | | | |
|---|---|---|---|
| 2017/0024649 A1* | 1/2017 | Yan | G06N 3/0454 |
| 2017/0228635 A1* | 8/2017 | Diev | G06N 3/02 |
| 2018/0191777 A1* | 7/2018 | Volkov | H04L 63/1483 |
| 2018/0330379 A1* | 11/2018 | Zoldi | G06N 3/0454 |
| 2018/0365522 A1* | 12/2018 | Jiang | G06N 3/08 |
| 2018/0365562 A1* | 12/2018 | Volkova | G06F 40/211 |
| 2019/0034939 A1* | 1/2019 | Thomas | G06N 3/0445 |
| 2019/0295088 A1* | 9/2019 | Jia | G06N 5/04 |
| 2019/0385170 A1* | 12/2019 | Arrabothu | G06N 7/005 |
| 2020/0034853 A1* | 1/2020 | Lim | G06Q 30/0609 |

* cited by examiner

ONLINE USER BEHAVIOR ANALYSIS SERVICE BACKED BY DEEP LEARNING MODELS TRAINED ON SHARED DIGITAL INFORMATION

CROSS-REFERENCE TO RELATED APPLICATION

This application claims priority to U.S. Provisional Application No. 62/712,648, filed on Jul. 31, 2018. The disclosure of the prior application is considered part of and is incorporated by reference in the disclosure of this application.

BACKGROUND

Technical Field

This specification relates to deep learning, user behavior analysis, and online fraud detection.

Background

Modern online fraud attacks are typically orchestrated by organized crime rings. In such attacks, coordinated malicious user accounts actively target various modern online services for real-world financial gain. Example attacks include fake reviews and "likes" to boost business reputation, promotional credits abused to gain an unfair advantage within games, transaction fraud using stolen financial information, account takeovers, and money laundering. These attacks can cause millions of dollars of loss to the online services, in addition to severely degrading brand name reputation and platform integrity.

Existing fraud solutions typically rely on blacklists or reputation lists for blocking known patterns of suspicious activities. For example, a blacklist may contain a list of IP addresses from which malicious activities have been previously observed. Future activities from those malicious IP addresses can then be blocked automatically. These static reputation lists or rules can only capture a small amount of malicious activities and are difficult to maintain, often requiring manual modifications by analysts on a regular basis. In addition, they only use a single source of information, such as the originating IP address, which lacks context about the users' activities and can lead to high false positive rate.

Another common solution is to leverage device fingerprinting to identify legitimate returning users and known malicious devices. Device fingerprints can take the form of, for example, browser and operating system (OS) configuration information and/or persistent HTTP cookies (for web users), mobile device identifiers, sensor readings, wi-fi information (for mobile users), or combinations thereof. While device fingerprints can be used to recognize returning devices, there is little they can do for newly-seen devices that lack a tracked history.

Other fraud solutions leverage machine learning algorithms to produce models to identify known fraud patterns. Given past examples of both fraudulent and normal activities (i.e., training data), machine learning algorithms can produce models that predict whether an event or user account is fraudulent or not, even when that event or user account was not in the training data. In contrast to static blacklists or reputation lists, machine learning models can generalize beyond the given examples to an extent and identify malicious activities similar to those in the past examples. However, machine learning algorithms require extensive manual work by human analysts to select useful features based on their domain knowledge of the problem and the dataset. This approach does not generalize well beyond the specific dataset or specific fraud type it addresses.

SUMMARY

The present specification describes uses of deep learning to provide online fraud detection. Potential applications of using deep learning for online fraud detection include allowing online service providers to perform user behavior analysis for detecting unwanted activities on the online service platform, such as spam, money laundering, transaction fraud, account takeover attacks, fake account registrations, promotion abuse, etc.

In contrast to existing fraud solutions that rely on carefully engineered features to produce models specific to a particular online service or dataset, the techniques described in this specification only use anonymous common digital information that is present in most (if not all) application-level events generated by user accounts as they interact with online services. This anonymized common digital information can include IP addresses or IP address prefixes, user agent strings, OS versions, email domains, and event timestamps. The anonymized common digital information is transmitted as part of a communication protocol (such as IP or HTTP/HTTPS) between an end user and an online service provider, or can be collected by the online service provider in exchange for access to the service.

By focusing on anonymized, common information collected by online services, a deep learning system can be agnostic to specific application semantics and can be applied to previously unseen datasets. In addition, the described techniques consider multiple pieces of anonymized digital information together and therefore are able to capture the interactions and correlations across different types of digital information and how they are used by each user account.

In some implementations, the deep learning system leverages a deep neural network model to perform user behavior analysis and to predict, given a set of anonymized common digital information in an application-level event, whether the user account associated with the event is fraudulent. Deep learning models are able to gain performance enhancements over traditional machine learning algorithms by leveraging large volumes of data. Such models include multiple layers of processing units, where each layer performs data transformation on the outputs of the previous layer. In this way, the raw input data is transformed into high-dimensional representations that can be used to model complex nonlinear relationships, without requiring labor-intensive feature engineering as in traditional machine learning algorithms.

To overcome the lack of labeled data in security and/or fraud applications, the deep learning system can make use of automatically-generated labels produced by unsupervised learning algorithms. Unsupervised learning algorithms do not require labeled data to construct a model, but instead are able to identify the underlying structure and correlations from the input data itself. Since online fraud is mainly orchestrated by organized crime rings controlling armies of fraudulent accounts, unsupervised learning lends itself well to online fraud detection since its inference ability allows it to identify groups of suspicious users that exhibit similar behavior profiles. An example of an unsupervised learning algorithm for performing user behavior analysis is detailed in one or more of the following U.S. Pat. Nos. 9,787,640, 10,009,358, 10,129,288 filed on Feb. 11, 2015, and U.S. Pat.

No. 10,110,616 filed on Feb. 11, 2015, all of which are incorporated here by reference.

In some implementations, the deep learning system is able to leverage manual labels as well as detection results from unsupervised machine learning algorithms to train a deep learning model for online fraud detection.

In some implementations, the deep learning system also provides an extension of a deep neural network trained on anonymized common digital information. Once such a generic model is trained, it can be extended by adding more neural network layers that are further trained on data sets specific to a particular online service or specific fraud type. This process, also called transfer learning, can generate a more customized deep neural network model. The resulting customized model contains both knowledge from the generic model as well as information specific to an online service, and therefore performs better for data queries pertaining to users active on the specific online service.

In general, one innovative aspect of the subject matter described in this specification can be embodied in a deep learning system infrastructure that supports deep learning algorithms to perform user behavior analysis for online fraud detection based on anonymized common information contained in digital online activities, where the deep learning system includes: a data storage module, a data processing module, a computing module that performs computations for training the deep neural network model, and a server module for serving queries to the deep learning model. The common digital information is leveraged to perform user behavior analysis and is transmitted as part of the communication protocol between user and online service provider, and/or collected by online service providers in exchange for access to the service. The deep neural network model can be trained on either or both manual labels and automatically generated labels produced by unsupervised machine learning algorithms; the trained deep neural network model is used to serve queries in real-time or in batch mode, where the queries consist of common digital information associated with user accounts and may contain data fields specific to an online service platform; and given a data query, the deep learning system responds with a prediction result corresponding to whether the anonymized common digital information is associated with fraudulent activities.

The foregoing and other embodiments can each optionally include one or more of the following features, alone or in combination. The common digital information leveraged include IP addresses or IP address prefixes, browser user agent strings, mobile device types, operating system versions, user nicknames, phone number prefixes, and email domains. The system allows online service providers to perform user behavior analysis for the purposes of detecting unwanted activities on the online service platform, such as spam, money laundering, transaction fraud, account takeover attacks, and fake account registrations. A subset of the labeled data for training the deep neural network model are generated by unsupervised learning algorithms. The data input to the system are application-level events generated by user accounts when interacting with online service providers, and include activities such as account sign up, login, online transactions, post, like, follow, message, or other application-specific actions. Each application-level event is generated by a user account, and includes the event timestamp, the event type, common digital information, and application-specific or event-specific information.

Additional features are derived from common digital information, where derived features include the geographic location of IP addresses or IP address prefixes (country, state/province, city), the internet autonomous system (AS) and IP subnet size of a given IP address, the geographic location associated with a given phone number prefix, and the age of a web or email domain (i.e., the time between when the domain was registered to the present), the web browser and operating system version given a user-agent string. Additional features are derived based on user behavior associated with these common digital information, such as the user population statistics, fraudulent user population statistics, the length of time a user is associated with a common digital information value, and sequences of values for common digital information that are associated with the same user.

The deep neural network is a transfer learning deep neural network model that leverages a pre-trained deep neural network based on anonymized common digital information plus customized layers trained on data specific to an online service provider.

The data pipeline is supported by Apache Spark and the deep neural network model is trained using the TensorFlow framework.

The server module responds to incoming data queries in real-time through a web interface backed by an HTTP server or through a custom application programming interface (API) endpoint for bulk queries. The server module includes a secondary server or multiple other servers for load-balancing and redundancy purposes. The system is able to incorporate feedbacks regarding its previous predictions into future models. The feedback module receives false positive (FP) and false negative (FN) requests through a customized application programming interface (API). The feedback data is then incorporated in the next iteration of model training.

In general, one innovative aspect of the subject matter described in this specification can be embodied in methods that include the actions of receiving a query associated with a user account of an online service provider; providing the query to a deep neural network model to generate a prediction of whether the user account is fraudulent, wherein the deep neural network model is trained using anonymized event data received from one or more online service providers; and providing the prediction to the online service provider.

In general, one innovative aspect of the subject matter described in this specification can be embodied in methods that include the actions of storing predictions generated by deep neural network model, wherein each prediction indicates whether a particular user account of a service provider is fraudulent; receiving feedback from one or more service providers indicating an accuracy of a corresponding prediction; and using the feedback to update the deep neural network model.

Other embodiments of these aspects include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. The deep-learning system can overcome limitations and challenges of conventional approaches. It is more scalable and require less private information (no personally identifiable information is needed) as compared to conventional solutions. A deep learning model can be built for large data sets without determined feature sets or labeled data (by leveraging results from a unsupervised learning algorithm). Tailoring each deep learning model to customize for specific service providers allows for more accurate predictions than a generic model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Recently, deep neural networks have become increasingly popular due to advances in computing and availability of large datasets. Deep learning algorithms have the advantage of being able to scale to very large data volumes while eliminating the complex feature engineering processes, though it also requires a large number of training examples for the model to "learn." While deep learning algorithms have been applied extensively in fields such as image recognition and speech recognition, there has been limited adoption in the areas of network/information security and fraud detection. In these contexts, labeled data is expensive to obtain (often requiring manual labeling), are often delayed (e.g., after a transaction chargeback occurs a few months later), and/or expire quickly as user behaviors and attacks evolve over time.

Figure 1:
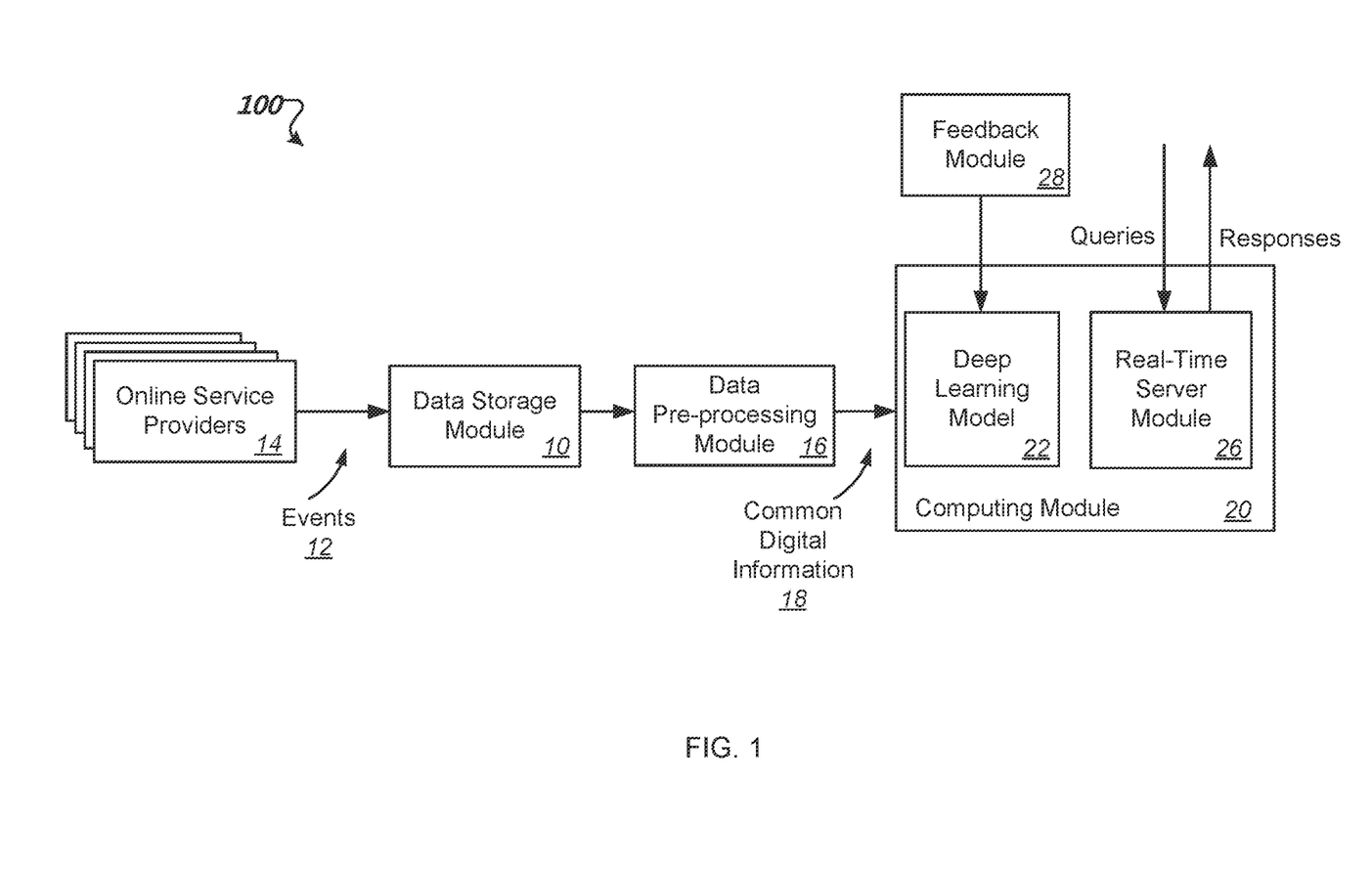
FIG. 1 is a system diagram of an example system architecture.

FIG. 1 shows a distributed system architecture 100 that is configured to process large volumes of data. The system architecture includes a data storage module 10 that continuously receives and stores application-level events 12, generated by users, from multiple online service providers 14. Online service providers include consumer-facing platforms that offer various types of services on the Internet, including social networks, financial services, online marketplaces, online games, etc. The application-level events received by the data storage module 10 from the online service providers 14 are provided to a data preprocessing module 16 that extracts out anonymized common digital information 18 from the application-level events 12 and further performs feature extraction on the events. The anonymized common digital information 18 may include, for example, IP addresses or IP address prefixes, user agent strings, OS versions, email domains, and/or event timestamps.

The anonymized common digital information 18 is provided to a computing module 20. The computing module 20 trains a deep learning neural network model 22 using the input data.

The computing module 20 also includes a real-time server module 26 that serves queries against the trained deep learning model 22 and a feedback module 28 that receives client feedback labels for a next iteration of training the deep learning model 22.

The application-level events 12 from users on online services can include actions the respective individual users perform when interacting with a particular online service provider 14. These actions can include activities such as account sign up, login, online transactions (e.g., for financial services or e-commerce services), post, like, follow, message (e.g., for social services), or other application-specific actions.

Each event is generated by a corresponding user account and typically includes the event timestamp, the event type, and common digital information 18. Thus, the event information includes the common digital information as well as event specific information. The common digital information 18 is either transmitted as part of the communication protocol (such as IP or HTTP/HTTPS) between user and online service provider, or required by online service provider in exchange for access to the service.

In some implementations, the storage system 10 that aggregates application-level events 12 collected from multiple online service providers 14 is a specialized computing system involving a large distributed file system. The distributed file system supports the storage of large objects, where each object may be on the order of hundreds of megabytes to gigabytes. Examples of storage systems include Hadoop Distributed File System (HDFS) and AMAZON Simple Storage Service (S3).

The data pre-processing module 16 reads application-level events 12 stored in the storage system 10 and parses the events to retrieve and anonymize the common digital information 18. Feature extraction is performed subsequently to generate a feature vector for each user and/or each application-level event, where the vector contains both the original, anonymized common digital information as well as features derived from the original data. The derived features may include both categorical and numerical features.

Examples of the derived features include the geographic location of an IP address or IP address prefix (country, state/province, city), the Internet autonomous system (AS) and IP subnet size of a given IP address, the geographic location associated with a given phone number prefix, and the age of a web or email domain (i.e., the time between when the domain was registered to the present), the web browser and operating system version given a user-agent string, as well as other behavioral attributes of the raw fields based on user population. The output feature vectors 24 from the data pre-processing module 16 are provided as input to the deep learning neural network model 22.

The deep neural network model 22 is a software component containing an instance of a machine learning model. One example of the software frameworks for building deep learning neural network models is TensorFlow, an open source software library for dataflow programming, machine learning, and deep learning.

Neural networks are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Once the deep neural network model 22 is trained, it can be used to serve against queries through the real-time server module 26, where the queries include anonymized common digital information associated with user accounts. The model prediction indicates whether or not the user associated with the given digital information in the query is fraudulent. In some implementations, the real-time server module 26 may serve incoming requests through a web interface backed by an HTTP server, or through a custom application programming interface (API) endpoint for bulk queries. The real-time server module 26 may include a secondary server or multiple other servers for load-balancing and redundancy.

The computing module 20 supports both the deep neural network model 22 and the real-time server module 26. In some implementations, the computing module 20 includes a specialized distributed computing architecture that is able to perform complex computations efficiently on large data volumes. Examples of distributed computing platforms include AMAZON Elastic Compute Cloud (EC2), MICROSOFT Azure, GOOGLE Cloud Platform, etc.

Figure 2:
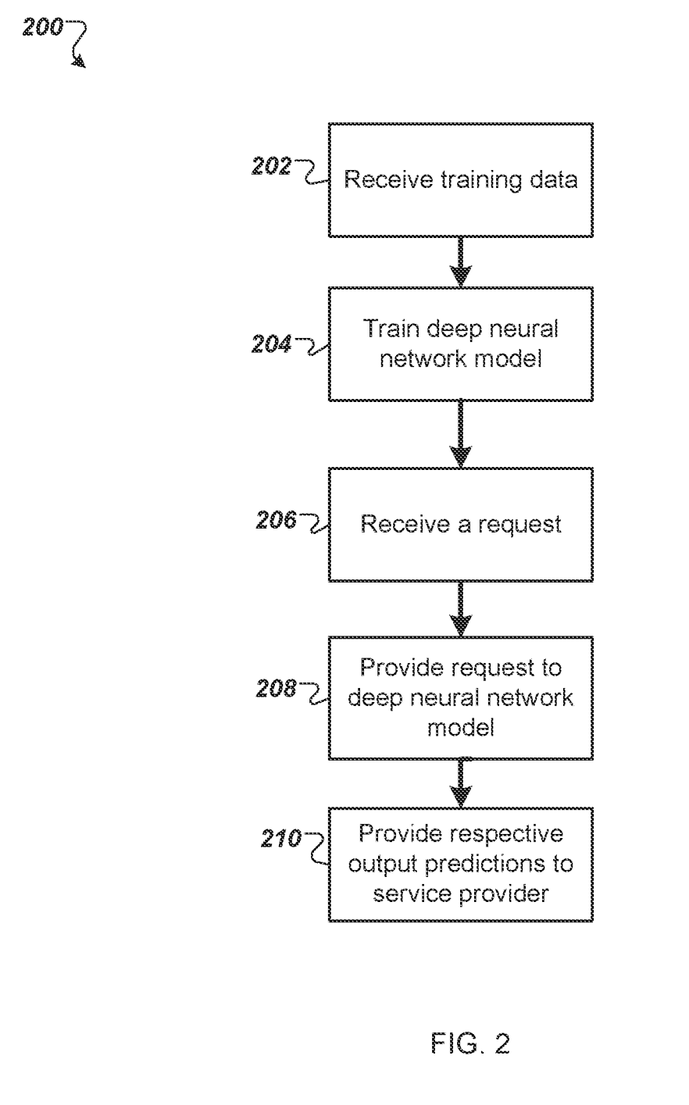
FIG. 2 is a flow diagram of an example process for fraud detection.

FIG. 2 is a flow diagram of an example process 200 for fraud detection. For convenience, the process 200 will be described as being performed by a system of one or more computers, located in one or more locations, and programmed appropriately in accordance with this specification. For example, a distributed system architecture, e.g., the distributed system architecture 100 of FIG. 1, appropriately programed, can perform the process 200.

The system receives training data 202. The training data can be generated from application-level event data received from one or multiple online service providers. In some implementations, the training labels are generated by unsupervised machine learning fraud detection algorithms, by human analysts that have domain expertise in fraud detection, or from user feedback, e.g., a credit card chargeback initiated by the fraud victim. In some implementations, the event data is processed to obtain common digital information (e.g., common digital information 18). This common digital information can be used to generate feature vectors, e.g., feature vectors 24, as input training data.

The system trains a deep neural network model using the training data 204. The deep neural network model can be, e.g., deep neural network model 22.

The system receives a request 206. The request can be associated with particular user accounts of the online service provider. For example, the request can include common digital information associated with one or more user accounts of the online service provider.

The system provides the request to the deep neural network model 208. The deep neural network model takes the common digital information as input and applies the model parameters to generate a model prediction output. The model prediction output can be a prediction of whether the particular user accounts associated with the common digital information are fraudulent.

The system provides respective output predictions to the online service provider 210.

One of the ways the system improves its prediction accuracy is by incorporating feedback regarding its previous predictions into an updated model or future models. The feedback module 28 receives false positive (FP) and false negative (FN) requests through a customized application programming interface (API). The feedback data is then incorporated in the next iteration of model training.

Figure 3:
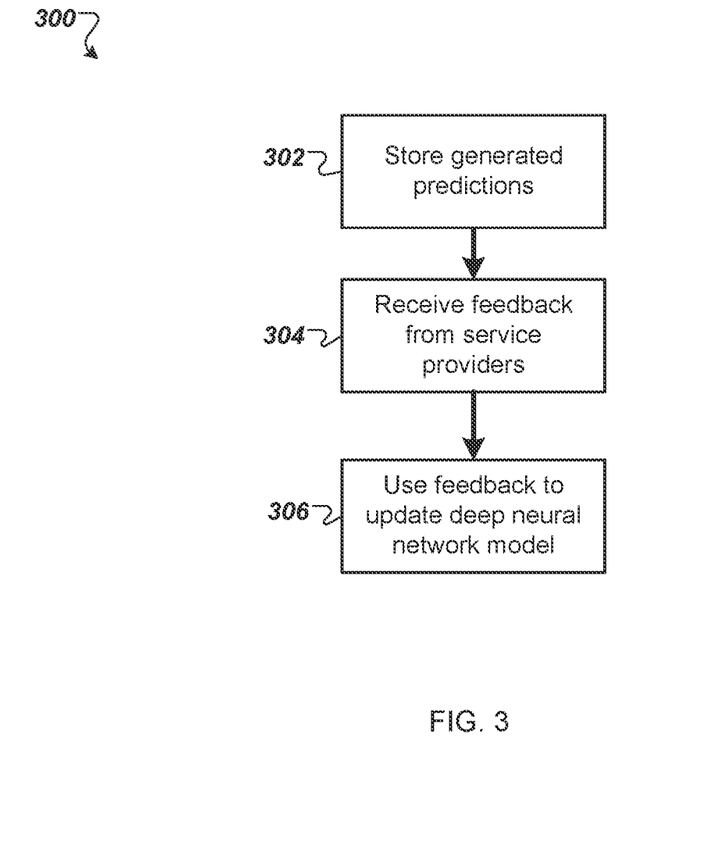
FIG. 3 is a flow diagram of an example process for using feedback to improve fraud predictions.

FIG. 3 is a flow diagram of an example process 300 for using feedback to improve fraud predictions. For convenience, the process 300 will be described as being performed by a system of one or more computers, located in one or more locations, and programmed appropriately in accordance with this specification. For example, a distributed system architecture, e.g., the distributed system architecture 100 of FIG. 1, appropriately programed, can perform the process 300.

The system stores predictions generated by the deep neural network model in response to client service provider requests 302. For example, in response to a given request the system can generate a prediction as to a particular user of the service provider being fraudulent.

The system receives feedback from different client service providers regarding the accuracy of respective predictions 304. For example, based on a given prediction, a service provider can perform further investigation into the user account. In some cases the prediction is confirmed. In other cases, a false positive or false negative result may be uncovered. The service provider can provide the system with information on the actual status of the user account and whether that agreed or disagreed with the system prediction.

The system uses the feedback to update the deep neural network model 306. For example, the feedback on specific instances provides labeled data that can be used to tune the parameters of the model during a next training iteration such that the updated model accurately predicts the user accounts being fraudulent or not fraudulent.

Figure 4:
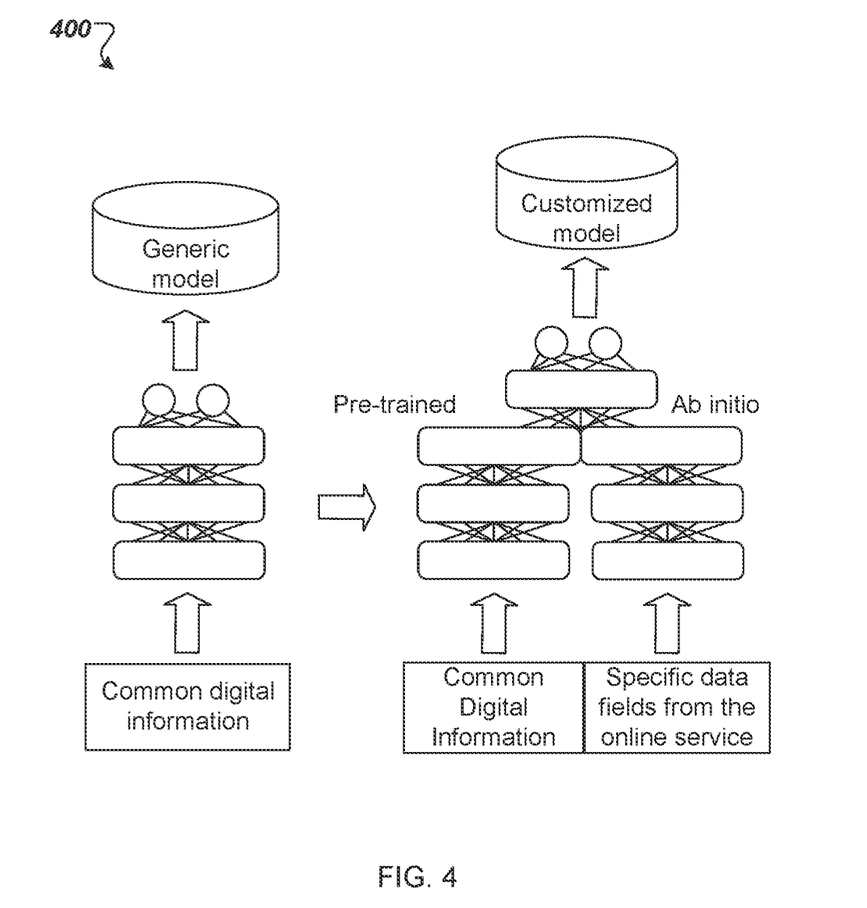
FIG. 4 is a schematic representation of an example customized deep neural network architecture.

FIG. 4 shows the schematic representation 400 of a customized deep neural network architecture that can be built to perform user behavior analysis for a specific online service provider. In addition to the common digital information 18, the customized model is also trained on specific data fields available to the targeted online service provider, such as transactional information (for financial or e-commerce services) and social activities like friending, posting, or messaging (for social services).

The customized model is an example of transfer learning, where a model learned from one (typically more general) domain is used to initialize another model targeting a more specific task. To achieve this, the latter model copies all but the last of the neural network layers from the former model, and then trains the last layer based on domain-specific data. In the context of the present specification, a deep learning model 22 leveraging only common digital information 18 is trained first, and then "stitched" to the customized deep learning model. The customized model then trains additional neural network layers based on features specific to the online service provider. The resulting customized model contains both knowledge from the generic model 22 as well as information specific to an online service, and hence performs better for data queries pertaining to users active on the specific online service.

Thus, for example, there can be multiple customized models for processing queries from different types of service providers. New customized models can be quickly generated by leveraging the generalized portion of the model and stitching based on the specific information of the new model. The customized models for different service providers may differ, for example, in the particular weights applied to neurons and one or more levels of the deep learning model.

EXPERIMENTAL RESULTS

Experiments using the deep learning system were performed on a month-long dataset containing 350 million application-level events per day on average, collected from multiple global online services.

Figure 5:
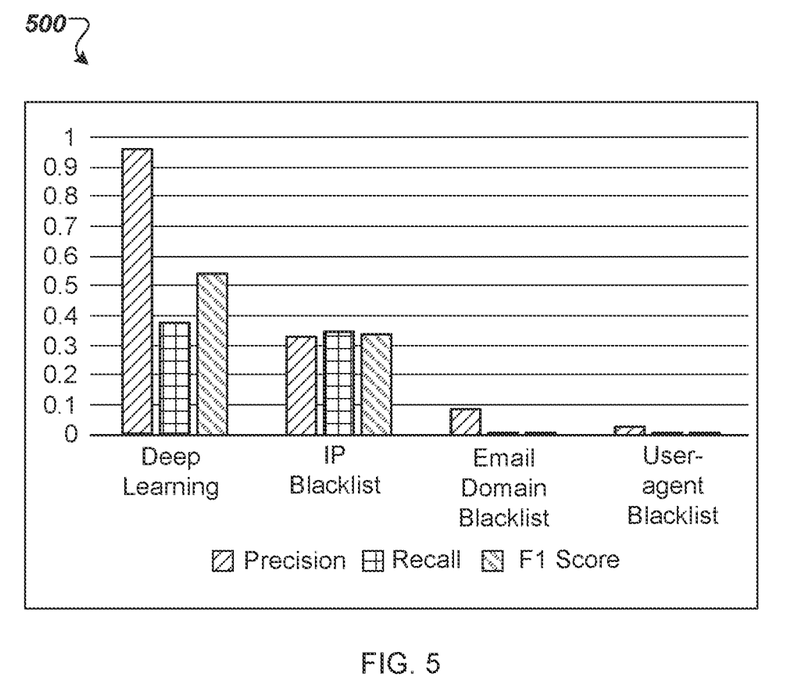
FIG. 5 is an example chart that compares the performance of a deep learning system with three types of blacklists according to precision, recall, and F1 score.

FIG. 5 is an example chart 500 that compares the performance of a deep learning system with three types of blacklists according to precision, recall, and F1 score. In particular, the deep learning system is represented as "Deep Learning" in FIG. 5 compared to an IP blacklist, an Email Domain Blacklist, and a User-agent blacklist. Each of the respective blacklists can be generated using traditional methods. All three displayed metrics—precision, recall, and F1 score—have their best value at 1 and worst at 0.

The blacklists were generated using the same dataset that was used to train the deep learning system. An IP address (or email domain, or user-agent string) is classified as "fraudulent" if the fraction of user accounts associated with it that are fraudulent is over a certain specified threshold, which was set to 0.95 in the experiments. Any user that uses one of these "fraudulent" identifiers is classified as "fraudulent" by the blacklists.

FIG. 5 shows that the performance of the deep learning system is significantly better than that of any individual blacklist. The deep learning system has better performance since it considers multiple pieces of digital information together and can capture the correlations across different types of digital information and how they are used by each user account.

Figure 6:
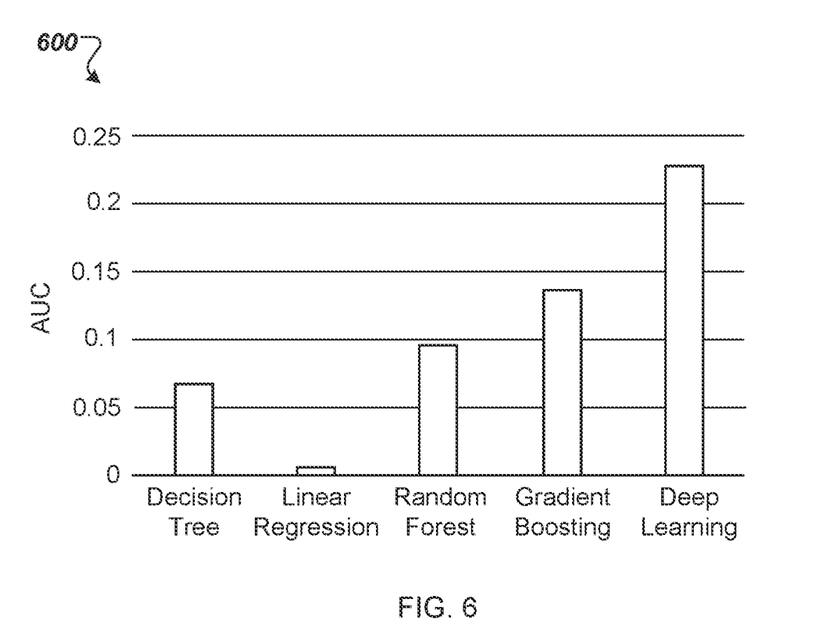
FIG. 6 is an example chart that compares the performance of the deep learning system with that of other types of supervised machine learning algorithms in terms of the precision and recall area under curve (AUC).

FIG. 6 is an example chart 600 that compares the performance of the deep learning system with that of other types of supervised machine learning algorithms in terms of the precision and recall area under curve (AUC).

FIG. 6 compares the performance of the deep learning system to models trained by other supervised machine learning algorithms. All of the models listed in FIG. 6 were trained on the same input and with the same features. The deep learning system outperformed all other supervised machine learning algorithms in terms of the precision recall area under curve (AUC).

In this specification the term "module" will be used broadly to refer to a software based system or subsystem that can perform one or more specific functions. Generally, a module will be implemented as one or more software modules or components, installed on one or more computers in one or more locations. In some cases, one or more computers will be dedicated to a particular module; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving training data comprising application-level event data for a plurality of accounts associated with one or more online service providers;
   extracting anonymized common digital information from the training data and using the common digital information to generate respective feature vectors for one or more of each user or each application-level event, wherein the common digital information comprises attributes of a digital communication that do not identify a particular user account and do not identify information about the event itself;
   training a deep neural network using the feature vectors as input, wherein the deep neural network is trained to determine model parameters such that applying the trained deep neural network model to an input comprising common digital information associated with a particular user account generates a prediction of whether the particular user account is fraudulent, wherein training the deep neural network model includes tailoring the model to domain specific information of the particular online service provider using a set of specific data fields available to a particular online service provider;

receiving a query associated with a first user account of an online service provider, wherein the query comprises first common digital information associated with the first user account;

providing the query to a deep neural network model, wherein the deep neural network uses the first common digital information and the trained model parameters to generate a prediction of whether the first user account is fraudulent; and providing the prediction for the first user account to the online service provider.

2. The method of claim 1, wherein the query comprises information associated with a particular user account of the online service provider including common digital information from application-level events associated with the particular user.

3. The method of claim 2, wherein the common digital information includes one or more of IP addresses or IP address prefixes, user agent strings, OS versions, email domains, or event timestamps.

4. The method of claim 2, wherein the query further comprises one or more application-level events generated by one or more user accounts, wherein the application-level events are generated as part of user interactions with the online service provider, and wherein each application-level event includes the common digital information.

5. The method of claim 4, wherein the user interactions include one or more of user account sign up, login, online transactions, or social media actions including message posting, liking, following, or commenting.

6. The method of claim 1, wherein the trained neural network model is configured to analyze user behavior based on the input query to detect activities including one or more of spam, money laundering, transaction fraud, account takeover attacks, or fake account registrations.

7. The method of claim 1, wherein training the deep neural network model includes deriving features from common digital information in the received collection of events.

8. The method of claim 7, wherein the derived features include one or more of geographic location of IP addresses or IP address prefixes, an internet autonomous system (AS) and IP subnet size of a given IP address, a geographic location associated with a given phone number prefix, an age of a web or email domain, or a web browser and operating system version given a user-agent string.

9. The method of claim 1, further comprising:
storing predictions generated by the deep neural network model;
receiving feedback from one or more service providers indicating an actual accuracy of a corresponding prediction; and
using the feedback to update the deep neural network model comprising updating the model parameters using specific prediction results as labeled training data.

10. A system comprising:
one or more hardware processors;
a data processing module for receiving application-level event data for a plurality of accounts from one or more online service providers and for generating common digital information from the event data, comprising:
extracting anonymized common digital information from the training data and using the common digital information to generate respective feature vectors for one or more of each user or each application-level event, wherein the common digital information comprises attributes of a digital communication that do not identify a particular user account and do not identify information about the event itself;
a training module for training a deep neural network using the feature vectors as input, wherein the deep neural network is trained to determine model parameters such that applying the trained deep neural network model to an input comprising common digital information associated with a particular user account generates a prediction of whether the particular user account is fraudulent, wherein training the deep neural network model includes tailoring the model to domain specific information of the particular online service provider using a set of specific data fields available to a particular online service provider; and
a computing module including the deep neural network model and a server module, wherein the deep neural network module, the deep neural network module configured to use the first common digital information to generate predictions of whether a the first user account of an online service provider is fraudulent and wherein the server module manages queries to the deep learning model from online service providers.

11. The system of claim 10, wherein the deep neural network is a transfer learning deep neural network model that leverages a pre-trained deep neural network based on anonymized common digital information plus customized layers trained on data specific to an online service provider.

12. The system of claim 10, wherein the server module responds to incoming data queries in real-time through a web interface backed by an HTTP server or through a custom application programming interface (API) endpoint for bulk queries.

13. The system of claim 10, wherein a query received by the deep learning model comprises information associated with a particular user account of the online service provider including common digital information from application-level events associated with the particular user.

14. The system of claim 13, wherein the common digital information includes one or more of IP addresses or IP address prefixes, user agent strings, OS versions, email domains, or event timestamps.

15. The system of claim 13, wherein the query further comprises one or more application-level events generated by one or more user accounts, wherein the application-level events are generated as part of user interactions with the online service provider, and wherein each application-level event includes the common digital information.

16. The system of claim 15, wherein the user interactions include one or more of user account sign up, login, online transactions, or social media actions including message posting, liking, following, or commenting.

17. The system of claim 10, wherein the trained neural network model is configured to analyze user behavior based on the input query to detect activities including one or more of spam, money laundering, transaction fraud, account takeover attacks, or fake account registrations.

18. The system of claim 10, wherein training the deep neural network model includes deriving features from common digital information in the received collection of events.

19. The system of claim 18, wherein the derived features include one or more of geographic location of IP addresses or IP address prefixes, an internet autonomous system (AS) and IP subnet size of a given IP address, a geographic location associated with a given phone number prefix, an age of a web or email domain, or a web browser and operating system version given a user-agent string.

20. The system of claim 10, further comprising:
- storing predictions generated by the deep neural network model;
- receiving feedback from one or more service providers indicating an actual accuracy of a corresponding prediction; and
- using the feedback to update the deep neural network model comprising updating the model parameters using specific prediction results as labeled training data.

\* \* \* \* \*

UNITED STATES PATENT AND TRADEMARK OFFICE
CERTIFICATE OF CORRECTION

PATENT NO. : 11,539,716 B2
APPLICATION NO. : 16/526402
DATED : December 27, 2022
INVENTOR(S) : Cong A. Meng et al.

It is certified that error appears in the above-identified patent and that said Letters Patent is hereby corrected as shown below:

In the Claims

Column 14, Line 27, in Claim 10: before "the" delete "a".

Signed and Sealed this
Fourteenth Day of February, 2023

Katherine Kelly Vidal
*Director of the United States Patent and Trademark Office*